United States Patent
McCormick et al.

(10) Patent No.: US 9,438,515 B2
(45) Date of Patent: Sep. 6, 2016

(54) METHOD AND APPARATUS FOR NETWORK ELEMENT RESOURCE UTILIZATION TRACKING

(75) Inventors: James Stewart McCormick, Sittsville (CA); Wei Gu, Ottawa (CA)

(73) Assignee: Alcatel Lucent, Boulogne-Billancourt (FR)

(*) Notice: Subject to any disclaimer, the term of this patent is extended or adjusted under 35 U.S.C. 154(b) by 1538 days.

(21) Appl. No.: 10/670,257

(22) Filed: Sep. 26, 2003

(65) Prior Publication Data

US 2005/0091363 A1   Apr. 28, 2005

(51) Int. Cl.
*H04L 12/801* (2013.01)
*H04Q 3/00* (2006.01)
*H04L 12/26* (2006.01)

(52) U.S. Cl.
CPC ............ *H04L 47/10* (2013.01); *H04L 47/29* (2013.01); *H04Q 3/0062* (2013.01); *H04L 43/0876* (2013.01); *H04L 43/16* (2013.01)

(58) Field of Classification Search
CPC ......... H04L 41/0604; H04L 41/0681; H04L 43/065; H04L 43/0876; H04L 43/16
USPC ................... 709/217–219, 223–229
See application file for complete search history.

(56) References Cited

U.S. PATENT DOCUMENTS

| | | | |
|---|---|---|---|
| 5,063,523 A * | 11/1991 | Vrenjak | 709/223 |
| 5,223,827 A * | 6/1993 | Bell et al. | 714/704 |
| 5,673,253 A * | 9/1997 | Shaffer | 370/229 |
| 5,796,633 A * | 8/1998 | Burgess et al. | 702/187 |
| 6,026,440 A * | 2/2000 | Shrader et al. | 709/224 |
| 6,088,688 A * | 7/2000 | Crooks et al. | 709/219 |
| 6,097,722 A * | 8/2000 | Graham | H04L 12/5602 370/395.21 |
| 6,260,062 B1 * | 7/2001 | Davis et al. | 709/223 |
| 6,289,017 B1 * | 9/2001 | Shani et al. | 370/395.53 |
| 6,834,304 B1 * | 12/2004 | Nisbet et al. | 709/224 |
| 7,000,013 B2 * | 2/2006 | Mei et al. | 709/223 |
| 7,143,153 B1 * | 11/2006 | Black et al. | 709/223 |
| 7,434,109 B1 * | 10/2008 | Stabile et al. | 714/47.2 |
| 2002/0039352 A1 * | 4/2002 | El-Fekih et al. | 370/252 |
| 2002/0138599 A1 * | 9/2002 | Dilman | H04L 12/24 709/223 |
| 2002/0147759 A1 * | 10/2002 | Ranganathan | 709/104 |
| 2002/0178385 A1 * | 11/2002 | Dent et al. | 713/202 |

(Continued)

FOREIGN PATENT DOCUMENTS

| | | | | |
|---|---|---|---|---|
| EP | 1244248 A1 * | 9/2002 | | H04L 12/24 |
| WO | 98/29984 A1 | 7/1998 | | |
| WO | 97/32448 A1 | 9/2007 | | |

OTHER PUBLICATIONS

European Search Report dated Dec. 15, 2010.

*Primary Examiner* — Scott M Sciacca
(74) *Attorney, Agent, or Firm* — Kramer & Amado, P.C.

(57) ABSTRACT

A method and apparatus are provided for monitoring resource utilization within a connection oriented switch. An operator defines a utilization threshold in terms of percentage of maximum capacity, and a connection resource tracker determines whether utilization of specified resources within the switch have exceeded this threshold. The switch then either sends a report to the operator identifying all such resources, or generates an alarm, revealing sources of congestion within the switch without requiring the operator to manually query each resource. The method and apparatus can alternatively be used to monitor for underutilization of resources. The method and apparatus allow rapid diagnostic and simplified monitoring of connection oriented switches.

42 Claims, 7 Drawing Sheets

(56) References Cited

U.S. PATENT DOCUMENTS

| | | | |
|---|---|---|---|
| 2003/0046396 A1* | 3/2003 | Richter et al. | 709/226 |
| 2004/0024859 A1* | 2/2004 | Bloch et al. | 709/223 |
| 2004/0030537 A1* | 2/2004 | Barnard | 702/194 |
| 2004/0044757 A1* | 3/2004 | Baker | 709/223 |
| 2005/0027842 A1* | 2/2005 | Kline | 709/223 |
| 2006/0153174 A1* | 7/2006 | Towns-von Stauber et al. | 370/356 |

* cited by examiner

METHOD AND APPARATUS FOR NETWORK ELEMENT RESOURCE UTILIZATION TRACKING

FIELD OF THE INVENTION

The invention relates to connection resource management in telecommunication systems, and more particularly to monitoring and display of node resources in such systems.

BACKGROUND OF THE INVENTION

Connection oriented network elements such as Asynchronous Transfer Mode switches have a number of resources. Resources have a maximum capacity and a utilization. Examples of resources are: traffic limited call admission control resources, such as bandwidth within an OC3 link or internal capacity within a line card; connection limited call admission control resources, such as the number of connection end points per line card; path identifications, such as VPI, VCI, and MPLS label ranges; and system limits, such as memory within the switch, number of leafs per system, number of connections per system, and number of connections in a connecting state (i.e. connections being set-up). Each of these and other resources are limited within a switch, each having a maximum capacity. The maximum capacity can be further limited when interfacing with other vendors' switches which support a lower number of connections. For example, a lower range of VPIs may be required that would otherwise be supportable by the switch.

Traffic through a connection oriented switch, both in terms of volume of traffic and number of connections, is limited by the capacity of the various resources. It is therefore important for diagnostic and monitoring purposes that an operator be able to determine utilization of the resources. Typically, the operator issues a command line interface (CLI) command to a management layer within the network element, asking for the utilization of a particular resource. The management layer queries a connection resource tracker, which determines the utilization of the resource. The connection resource tracker may determine the utilization by querying other components within the network element. The connection resource tracker reports the utilization of the resource to the management layer, which relays the utilization to the operator.

When a problem arises within a network, such as repeated call connection blockage or unwanted call cancellations, the operator typically queries each network element for resource utilization. Even in the absence of such a problem, the operator may want to monitor resource utilization to identify potential bottlenecks. The operator issues a separate CLI command for each resource in turn for each network element. Given the large number of resources used by a network element, this is a time consuming and inefficient process. Even if a script is used to retrieve the utilization of all resources, the amount of information which the operator must then process is cumbersome. Furthermore, by the time the operator queries utilization of the problematic resource, or even begins searching for the problem, the resource utilization may have changed and the source of the problem may no longer be apparent. A system which allowed resource shortages to be flagged to an operator automatically, or to alert an operator of resources approaching their maximum capacity, would allow speedier diagnostics and more convenient monitoring of connection oriented switches.

SUMMARY OF THE INVENTION

In accordance with one aspect of the invention, a method is provided for monitoring resource utilization within a connection oriented switch, comprising the steps of: providing at least one utilization threshold; for each of a plurality of resources, each corresponding to one of the at least one utilization threshold, determining whether a utilization of the resource is above the corresponding utilization threshold; and identifying each resource for which the utilization is above the corresponding utilization threshold. A report may be generated including any identified resources, and the report may be presented to an operator. Upon identification of a resource for which the utilization is above the corresponding utilization threshold, an alarm may be generated identifying the resource, and the alarm may be presented to the operator. In one embodiment, receipt of call connection establishment signals is monitored, and determination of a resource for which utilization is above the corresponding utilization threshold is only made upon receipt of a call connection establishment signal, as is identification of each such resource.

In accordance with another aspect of the invention, a method is provided for monitoring resource utilization within a connection oriented switch, comprising the steps of: providing at least one utilization threshold; for each of a plurality of resources, each corresponding to one of the at least one utilization threshold, determining whether a utilization of the resource is below the corresponding utilization threshold; and identifying each resource for which the utilization is below the corresponding utilization threshold. A report may be generated including any identified resources, and the report may be presented to an operator.

Processors and computer readable media are provided for implementing the methods summarized above.

The method and network elements of the present invention allow resource utilization to be monitored in a timely manner that is useful to an operator. The operator can determine quickly which resources are approaching maximum capacity, or alternatively which resources are being underutilized, without having to sift through an overwhelming amount of information. An alarm system can also be implemented, alerting an operator when utilization of any resource is approaching a critical level.

BRIEF DESCRIPTION OF THE DRAWINGS

The features and advantages of the invention will become more apparent from the following detailed description of the preferred embodiment(s) with reference to the attached figures, wherein.

DETAILED DESCRIPTION OF THE EMBODIMENTS

Figure 1:
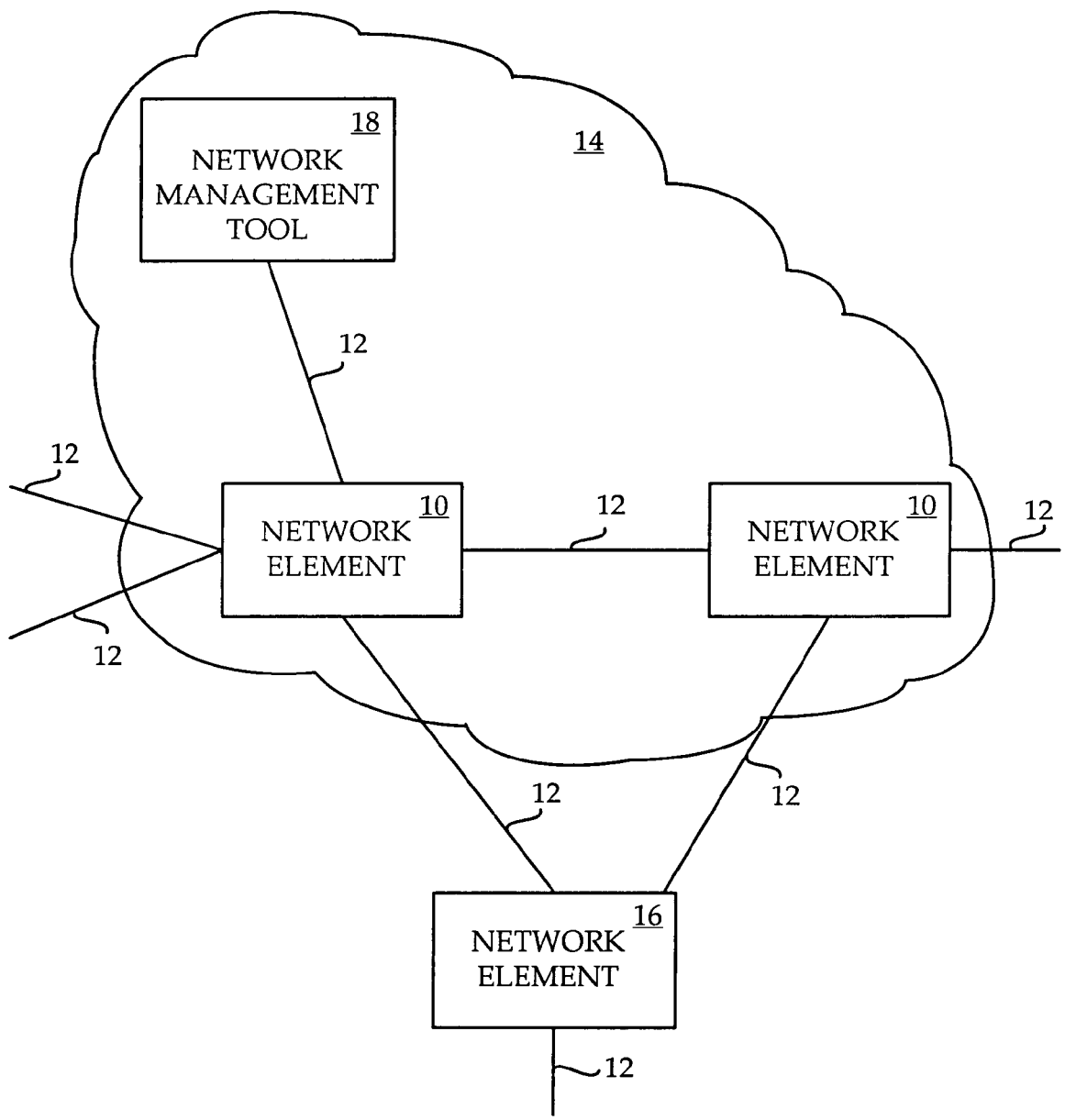
FIG. 1 is a block diagram of a communication network.

Referring to FIG. 1, a portion of an example connection oriented communication network is shown. A plurality of network elements 10, such as Asynchronous Transfer Mode (ATM) switches, are interconnected by links 12, and are under a single administrative control 14. Although two network elements 10 are shown as being under the administrative control 14 in FIG. 1 for the purposes of illustration, more generally there is at least one such network element 10. At least one of the network elements 10 may also be interconnected with at least one external network element 16 via links 12. A network management tool 18 is connected to at least one of the network elements 10, and allows an operator to perform OAM&P tasks on the network elements 10.

Associated with each network element 10 is a plurality of resources. Examples of resources are bandwidth, line card capacity, number of connection end points supportable per line card, Virtual Path Identifier (VPI) ranges, Virtual Channel Identifier ranges, MultiProtocol Label Switching (MPLS) label ranges, memory within the switch, number of supportable leaf endpoints per system, number of supportable connections in a connecting state, number of MPLS state blocks, and number of connections stored in a database. Each resource has a utilization and a capacity. The utilization of a resource measures how much of the resource is currently in use or reserved for use. The capacity of a resource measures the total availability of the resource. The utilization is expressible as a percentage of the capacity. As an example of a utilization and a capacity, VPIs in some switches may be take values within a range of 0 to 255. If 205 virtual paths have been set up through the switch, the VPI utilization would be 80%.

Figure 2:
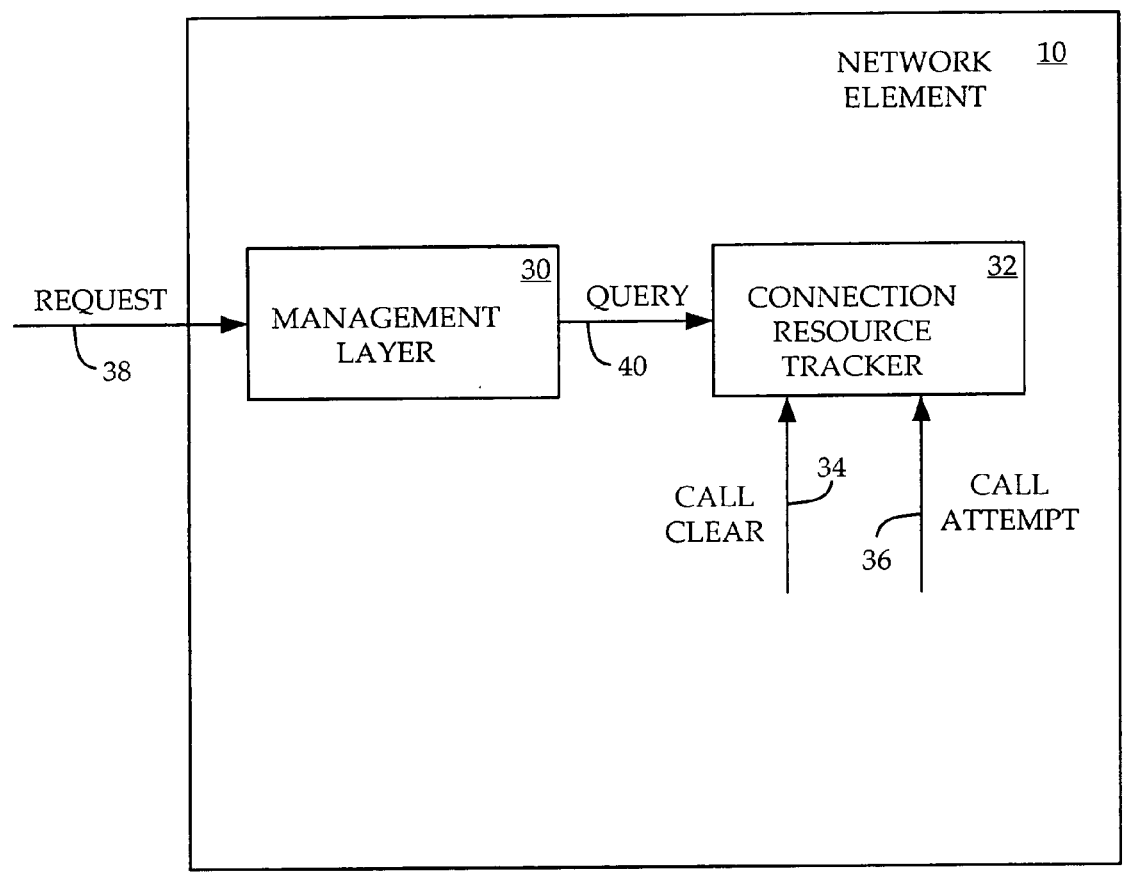
FIG. 2 is a block diagram of a network element within the communication network of FIG. 1, according to one embodiment of the invention.

Referring to FIG. 2, a block diagram of a network element 10 of FIG. 1 according to one embodiment of the invention is shown. The network element 10 includes a management layer 30 and a connection resource tracker 32. The connection resource tracker 32 includes instructions for retrieving resource information particular to the network element 10. In the preferred embodiment, the instructions are in the form of software loaded into a processor, but may more generally be in any combination of software or hardware within a processor, including hardware within an integrated circuit. The processor need not be a single processor, but rather the instructions could be located in more than one processor.

The connection resource tracker 32 maintains a partial database of resource utilization, the contents of which are changed upon receipt of call clear messages 34 and call connection attempt messages 36. When the management layer 30 receives an operator request 38, for example from an operator via the network management tool 18, the management layer 30 generates a query 40 in response thereto. The management layer 30 sends the query 40 to the connection resource tracker 32, which then consults its database and queries other standard components (not shown in FIG. 1) in the network element 10 to retrieve the resource information specified by the query 40.

Figure 3:
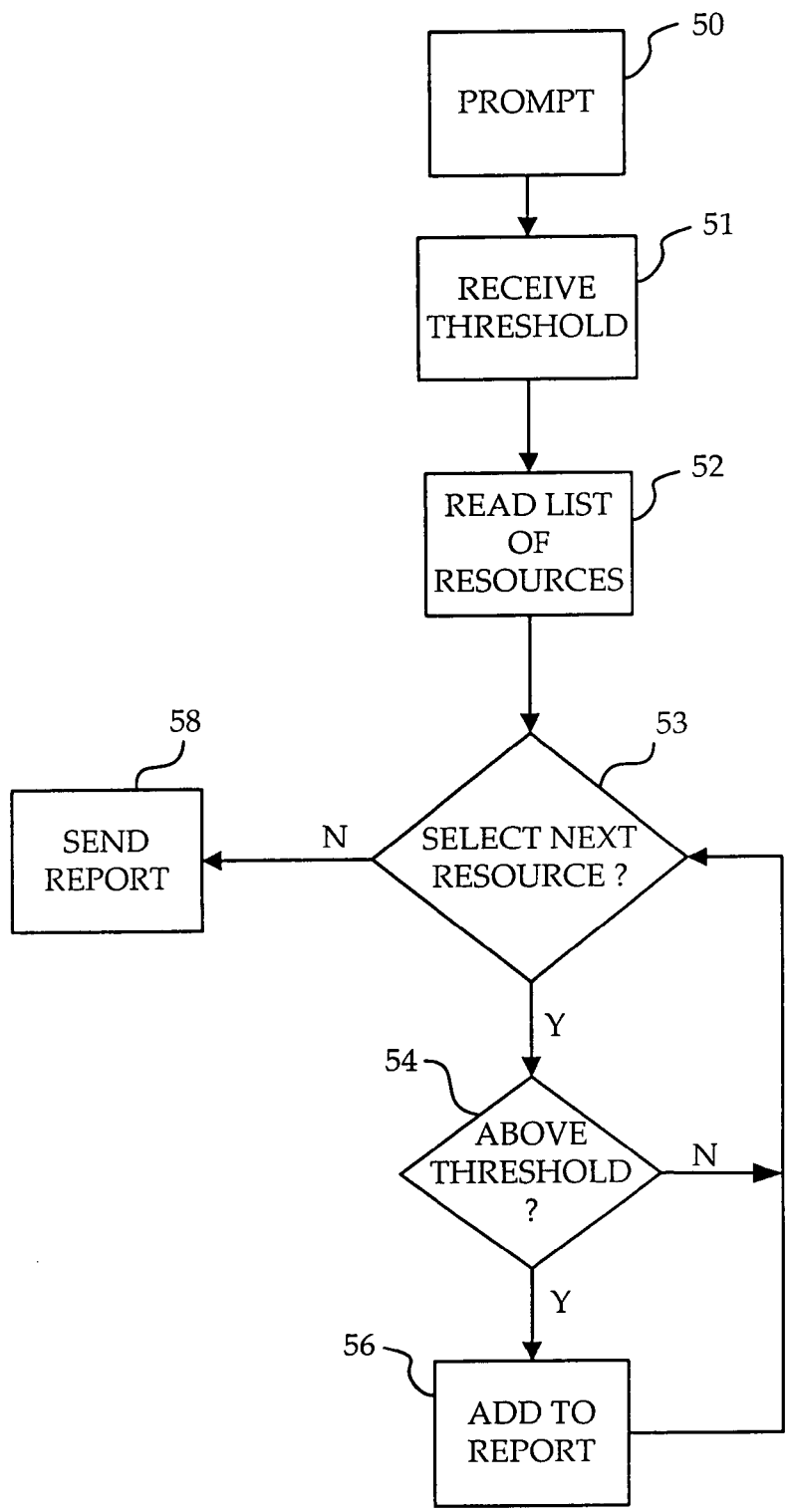
FIG. 3 is a flowchart of a method by which the network element of FIG. 2 monitors resource utilization according to one embodiment of the invention.

Referring to FIG. 3, a flowchart of a method by which the network element 10 performs resource utilization monitoring according to one embodiment of the invention is shown. Broadly, the connection resource tracker determines for each of a set of resources within the network element whether utilization of the resource is above a specified threshold, and reports any such resources. At step 50 the network element is prompted to begin resource utilization monitoring, such as the receipt of a signal sent by an operator. At step 51 the connection resource tracker 32 receives a utilization threshold in the form of a percentage of maximum capacity, such as "80%" or "0.8". The utilization threshold can be received in a number of ways. As examples, the connection resource tracker could read the utilization threshold from a database, could access the utilization threshold from memory (including a hardcoded value), or could read the utilization threshold from a signal sent by an operator. In the latter case, the steps 50 and 51 could be combined into a single step of prompting the connection resource tracker by sending a utilization threshold.

At step 52 the connection resource tracker reads a list of resources. The list of resources may be read in a number of ways. As examples, the connection resource tracker could read the list of resources from a database, could access the list of resources from memory (including hardcoded values), or could read the list of resources from a signal sent by an operator. In the latter case, the steps 50, 51, and 52 could be combined into a single step of prompting the connection resource tracker by sending a utilization threshold and a list of resources. Alternatively, the steps 50 and 52 could be combined into a single step of prompting the connection resource tracker by sending a list of resources, the utilization threshold being received at step 51 by some other means.

At step 53 the connection resource tracker attempts to select a next resource in the list of resources, which in the case of the first iteration will be a first resource in the list of resources. If a next resource exists at step 53, the connection resource tracker 32 determines at step 54 whether the utilization of that resource expressed as a percentage of the capacity of that resource is above the utilization threshold received at step 51. Determining the capacity and utilization of each resource is a capability already present in existing ATM switches and other connection oriented network elements.

If at step 54 the connection resource tracker 32 determines that the utilization of the resource is above the utilization threshold, then at step 56 the connection resource tracker 32 identifies the resource and adds an identification of the resource to a report. The connection resource tracker 32 may also add the actual utilization of the resource, either in absolute terms or as a percentage of capacity, to the report. Once an identification of the resource has been added to the report, or if the connection resource tracker 32 determines at step 54 that the utilization of the resource is not above the utilization threshold, then the connection resource tracker 32 attempts to select a next resource at step 53. The connection resource tracker 32 determines whether the utilization of each resource in turn is above the utilization threshold, until no more resources are found at step 53. At step 58, the connection resource tracker sends the report to the management layer 30.

Figure 4:
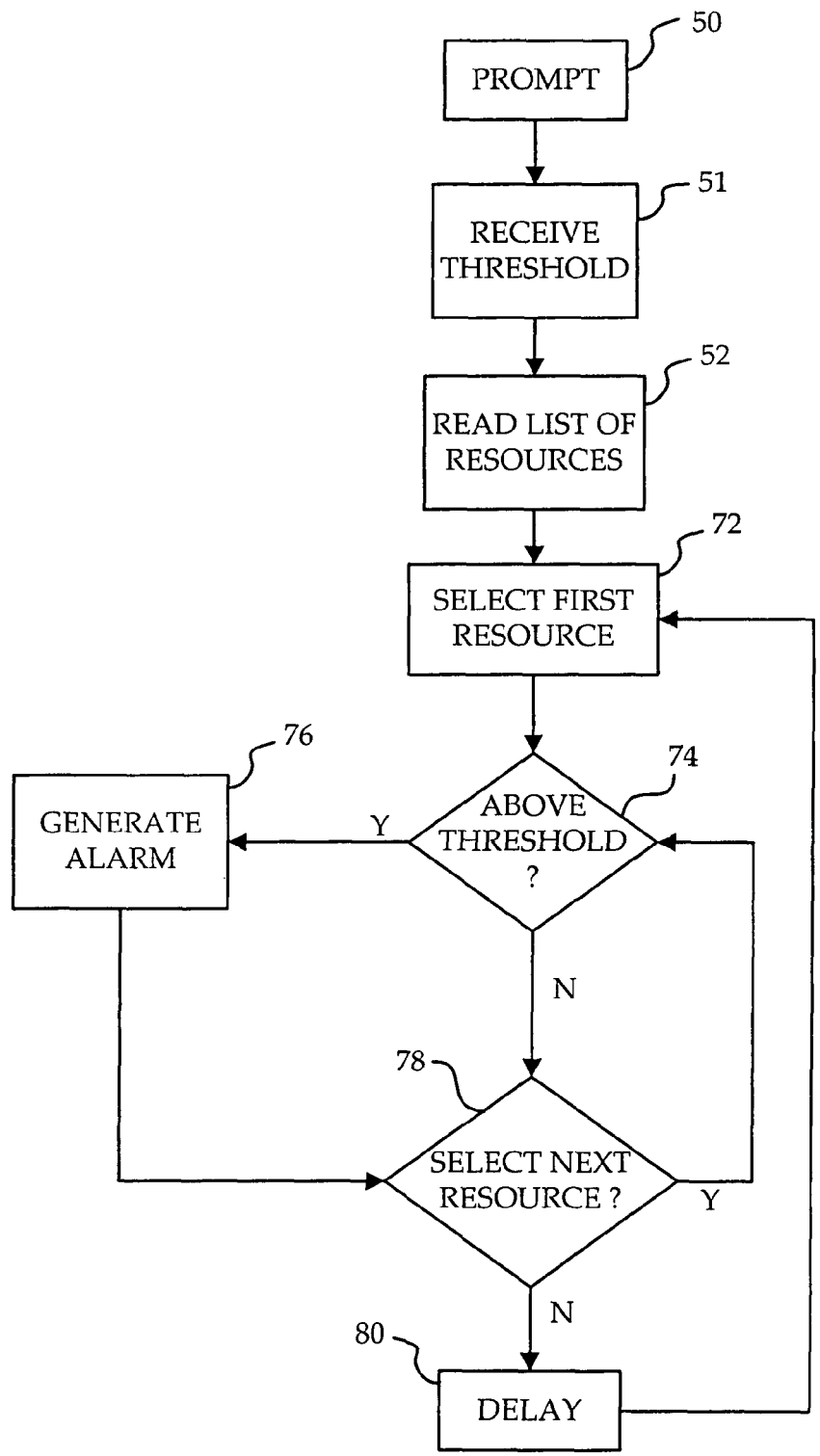
FIG. 4 is a flowchart of a method by which the network element of FIG. 2 monitors resource utilization according to another embodiment of the invention.

Referring to FIG. 4, a flowchart of a method by which the network element 10 performs resource utilization monitoring according to a second embodiment of the invention is shown. Broadly, the connection resource tracker determines periodically for each resource in a set of resources within the network element whether the utilization of the resource has exceeded a specified threshold, and generates an alarm identifying any such resources. The connection resource tracker 32 receives a prompt 50, receives a utilization threshold 51, and reads a list of resources 52 as described above with reference to FIG. 3. The utilization threshold is in the form of a percentage of maximum capacity, such as "90%" or "0.9".

At step 72 the connection resource selects a first resource in the list of resources. The connection resource tracker 32 determines at step 74 whether the utilization of the selected resource expressed as a percentage of the capacity of that resource is above the utilization threshold. If the utilization is above the utilization threshold, the connection resource tracker 32 generates an alarm identifying the resource and possibly indicating the actual utilization of the resource. The alarm is a particular example of a report. Generation of the alarm at step 76 is similar to the steps 56 and 58 of FIG. 3 of adding an identification to the report and sending the report respectively, but the report (in the form of the alarm) is sent to the management layer 30 immediately.

Once an alarm has been generated, or if the utilization of the resource was not above the utilization threshold at step 74, then the connection resource tracker 32 attempts to select a next resource at step 78. If a next resource exists at step 78, the connection resource tracker 32 determines at step 74 whether the utilization of that resource expressed as a percentage of the capacity of that resource is above the utilization threshold. The connection resource tracker 32 determines whether the utilization of each resource in turn is above the utilization threshold, until no more resources are found at step 78. Once the connection resource tracker 32 has determined the utilization of each resource, the connection resource tracker 32 pauses at step 80 for a configured length of time before beginning again with the first resource at step 72. The configured length of time will depend on how often an administrator or operator wishes the utilization of resources to be checked, and may in fact be equal to zero.

Figure 5:
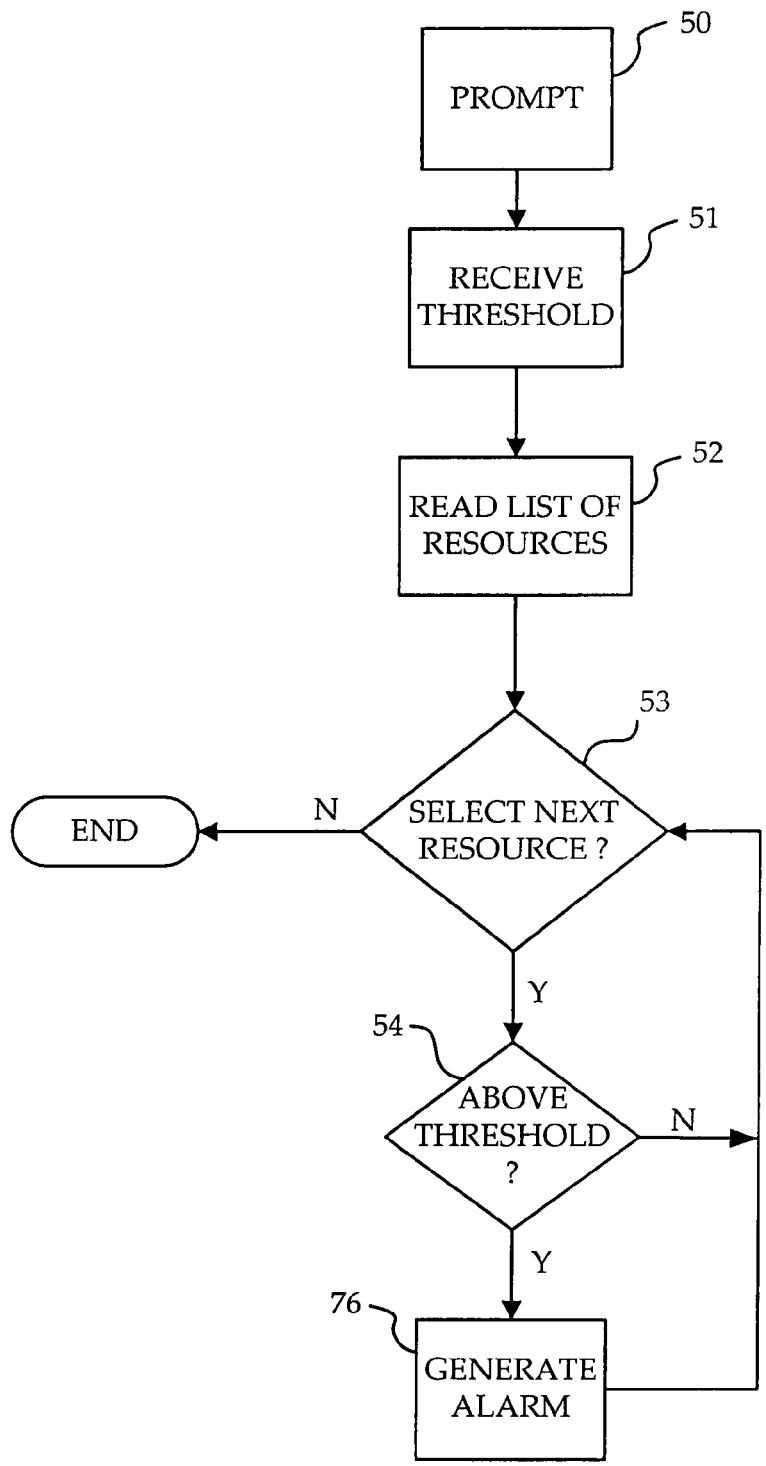
FIG. 5 is a flowchart of a method by which the network element of FIG. 2 monitors resource utilization according to yet another embodiment of the invention.

Referring to FIG. 5, a flowchart of a method by which the network element 10 performs resource utilization monitoring according to a third embodiment of the invention is shown. Broadly, the connection resource tracker determines, upon request, for each resource in a set of resources within the network element whether the utilization of the resource has exceeded a specified threshold, and generates an alarm identifying any such resources. This embodiment is similar to the embodiment described above with reference to FIG. 3, except that the steps 56 and 58 of adding an identification to the report and sending the report respectively are replaced by a single step 76 of generating an alarm, described above with reference to FIG. 4. This embodiment is different from the embodiment described with reference to FIG. 4 in that the check for threshold crossing is performed when prompted to do so by an external agent. This allows an operator to query for threshold crossings at the operator's convenience, or allows software on the network management tool 18 to periodically query for threshold crossings.

Figure 6:
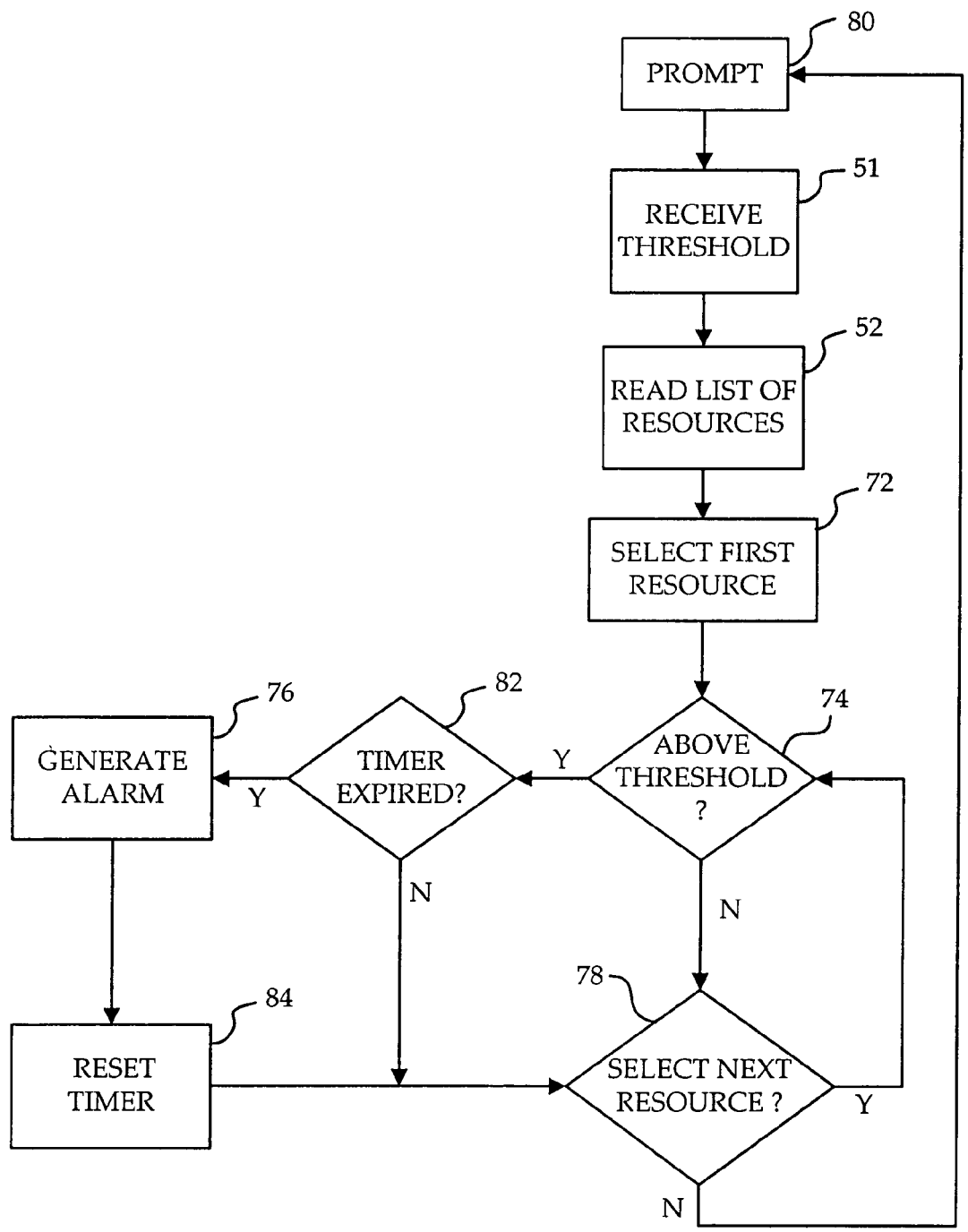
FIG. 6 is a flowchart of a method by which the network element of FIG. 2 monitors resource utilization according to yet another embodiment of the invention.

Referring to FIG. 6, a flowchart of a method by which the network element 10 performs resource utilization monitoring according to a fourth embodiment of the invention is shown. Broadly, the connection resource tracker determines, upon receipt of a call connection signal, for each resource in a set of resources within the network element whether the utilization of the resource has exceeded a specified threshold, and generates an alarm identifying the resource if a set amount of time has elapsed since an alarm was last generated for the resource. This embodiment is similar to the embodiment described above with reference to FIG. 4, except that the step 50 of receiving a prompt is replaced by the step 80 of receiving a prompt in the form of a call connection signal. The call connection signal is any signal indicating to the connection resource tracker that a new call connection through the network element has been established. Furthermore, when the connection resource tracker determines at step 74 that the utilization of a resource is above the specified threshold, the resource tracker determines at step 82 whether a timer associated with the resource has expired. If the timer has expired, then the connection resource tracker generates an alarm at step 76 as described above, and resets the timer at step 84. If the timer has not expired, then no alarm is generated. In this way, the connection resource tracker will not repeatedly generate alarms for a resource as new call connections are established, but rather will wait a preset duration between generating alarms.

The timer need not be used, in which case the steps of determining whether a timer has expired and of resetting the timer are omitted from FIG. 6. However, this could result in many repeated alarms being generated for the same resource shortage, due to numerous new call connection establishments while utilization of the resource is above the utilization threshold.

Figure 7:
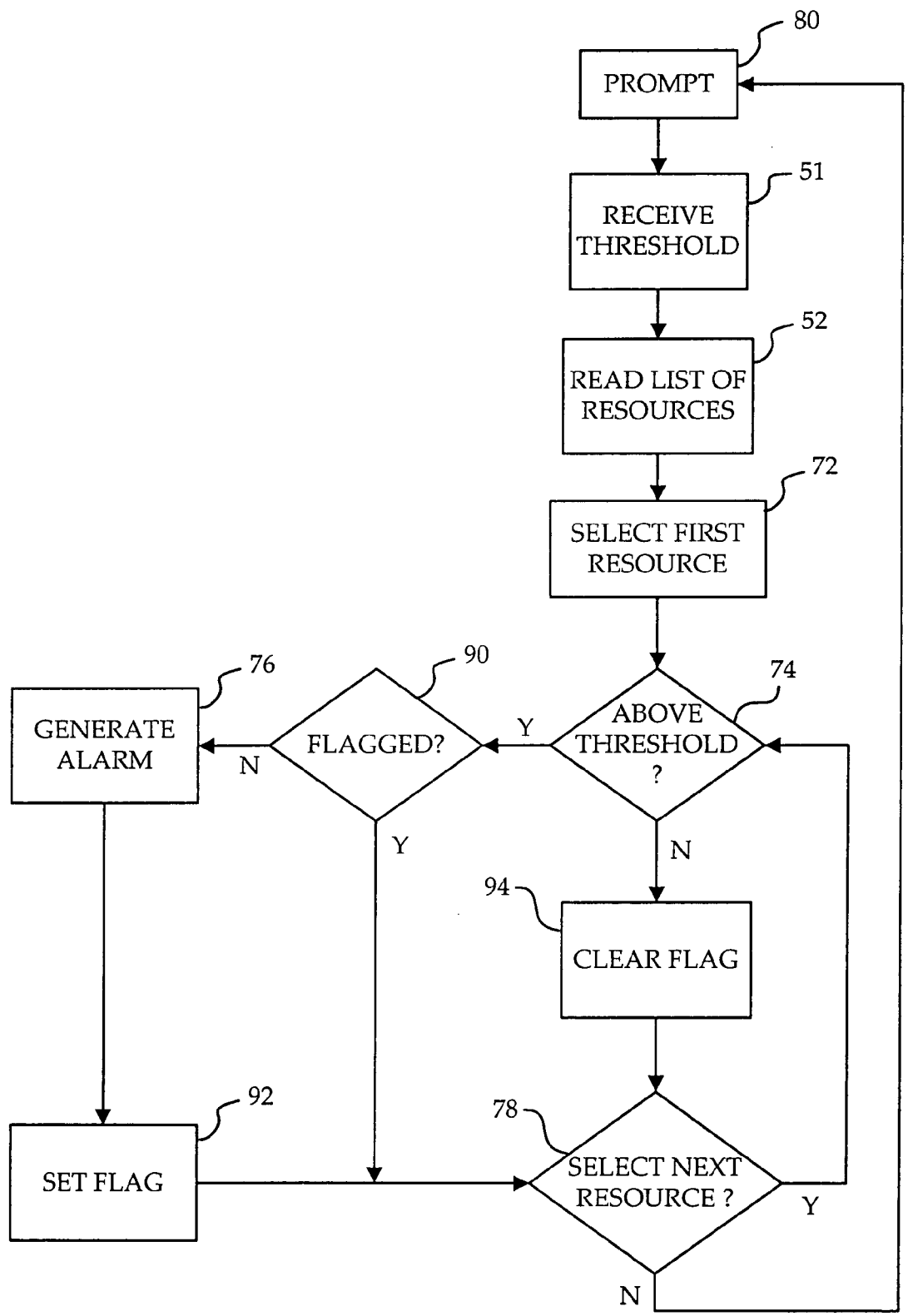
FIG. 7 is a flowchart of a method by which the network element of FIG. 2 monitors resource utilization according to yet another embodiment of the invention.

Referring to FIG. 7, a flowchart of a method by which the network element 10 performs resource utilization monitoring according to a fifth embodiment of the invention is shown. Broadly, the connection resource tracker determines, upon receipt of a call connection signal, for each resource in a set of resources within the network element whether the utilization of the resource has exceeded a specified threshold, and generates an alarm identifying the resource if an alarm has not been generated since the utilization of the resource last rose above the specified threshold. This embodiment is similar to the embodiment described above with reference to FIG. 6, except that the steps 82 and 84 involving the timer are removed, and steps 90, 92 and 94 involving a flag are introduced.

If the connection resource tracker determines at step 74 that the utilization of a resource is above the specified threshold, the resource tracker determines at step 90 whether a flag associated with the resource indicates that an alarm has recently been generated for that resource. If the flag does not indicate that the alarm has recently been set, then the connection resource tracker generates an alarm at step 76 as described above, and sets the flag at step 92 to indicate that an alarm has recently been generated for the resource. If the connection resource tracker determines at step 90 that the flag does indicate that the alarm has recently been set, then an alarm is not generated. If the connection resource tracker determines at step 74 that the utilization of the resource is not above the specified threshold, then at step 94 the connection resource tracker clears the flag so that the flag indicates that an alarm has not recently been generated for the resource. In this way, the connection resource tracker will not repeatedly generate alarms for a resource as new call connections are established, but rather will wait until the utilization of the resource falls below the threshold before considering whether to generate a new alarm.

The method described above with reference to FIG. 3 may be combined with the method described above with reference to FIG. 4, FIG. 5, FIG. 6, or FIG. 7. In other words, the connection resource tracker can monitor for resources whose utilization exceeds a first threshold and generate an alarm in response thereto, while also responding to requests to identify resources whose utilization exceeds a second threshold. Generally, the first threshold used for generating alarms should be higher than the second threshold used to monitor high utilization, although this need not be the case.

The method has been described as monitoring for resource utilization which exceeds a utilization threshold. Alternatively, the connection resource tracker can be configured to monitor for resource utilization which falls below a utilization threshold by changing the steps 54 and 74 to determination of whether the utilization of a resource falls below a specified threshold. If this threshold is set at a low value, an operator can locate any resources which are being underutilized. This embodiment is particularly applicable to the method described above with reference to FIG. 3, as there is generally no need to generate an immediate alarm if resource utilization falls below a threshold.

The invention has been described as using a single threshold, expressed as a percentage of capacity, for all connection resources being monitored. Alternatively, each connection resource being monitored may have a respective utilization threshold. This allows different thresholds to be set for different connection resources, and also allows the thresholds to be expressed in absolute terms rather than as a percentage of capacity of the resource. However, the step 51 of receiving the threshold must then receive a threshold for each connection resource being monitored.

The invention has been described as considering whether the utilization of each resource is above or below a threshold. Alternatively, the connection resource tracker could determine whether the utilization of each resource is greater than or equal to a threshold, or whether the utilization of each resource is less than or equal to a threshold.

The embodiments presented are exemplary only and persons skilled in the art would appreciate that variations to the above described embodiments may be made without departing from the spirit of the invention. For example, methods which are logically equivalent or similar to the methods shown in FIG. 3, FIG. 4 and FIG. 5 may be used to implement the methods of the invention. The scope of the invention is solely defined by the appended claims.

We claim:

1. A method of monitoring and diagnosing resource utilization within a connection oriented network made of network elements, at least one of said network elements including a connection resource tracker for maintaining a database of resource utilization, the method comprising:
    specifying a plurality of resource types for the network elements of the connection oriented network, each resource type being defined by a capacity limit and a utilization;
    providing a utilization threshold and a specified threshold for each specified type of resource, wherein the utilization threshold that triggers monitoring of high utilization is set at a threshold value used to determine whether resources are being over-utilized, and the specified threshold that triggers generation of alarms is set at a threshold value used to determine whether resources used are exceeding a maximum allowable limit;
    monitoring for receipt of call connection establishment signals;
    measuring the utilization for all resources at the network elements;
    in response to a query from a user relating to a particular type of resource, comparing the utilization for all resources of the particular type as measured in the measuring step with the utilization threshold for said particular type for determining whether the utilization of any resource of said particular type is above the corresponding utilization threshold;
    if the utilization is above the corresponding utilization threshold for at least one said resource, generating a report and identifying in the report each resource of the particular type for which the utilization is above the corresponding utilization threshold and presenting the report to an operator of said connection oriented network;
    if the utilization is above the corresponding specified threshold for at least one said resource, checking a timer associated with the resource;
    when the timer has expired, generating an alarm for the resource and resetting the timer associated with the resource only when the alarm has been generated for the resource; and,
    when the timer has not expired, selecting a next resource.

2. The method of claim 1, wherein the plurality of resource types includes at least one of bandwidth, line card capacity, number of connection end points per line card, Virtual Path Identifier numbers, Virtual Connection Identifier numbers, MultiProtocol Label Switching (MPLS) label numbers, memory within the switch, number of supportable leaf endpoints per system, number of supportable connections in a connecting state, number of MPLS state blocks, and number of connections in a database.

3. The method of claim 1, wherein the step of comparing the utilization for all resources is carried out only with respect to resources within a list of resources.

4. The method of claim 3, further comprising:
    receiving at least one utilization threshold from the operator.

5. The method of claim 1, wherein the step of generating the report further comprises:
    receiving at least one utilization threshold from the operator.

6. The method of claim 1, wherein the step of generating the report further comprises:
    including the utilization of any identified resources in the report.

7. The method of claim 6, wherein the step of specifying the plurality of resource types further comprises:
    providing a list of resources, the list of resources including at least one of bandwidth, line card capacity, number of connection end points per line card, Virtual Path Identifier numbers, Virtual Connection Identifier numbers, MultiProtocol Label Switching (MPLS) label numbers, memory within the switch, number of supportable leaf endpoints per system, number of supportable connections in a connecting state, number of MPLS state blocks, and number of connections in a database, the step of generating the report is carried out only with respect to resources within the list of resources, and further comprising:
    receiving at least one utilization threshold from the operator.

8. The method of claim 1, further comprising:
    upon identification of a resource for which the utilization is above the specified threshold, generating an alarm identifying the resource; and
    presenting the alarm to the operator.

9. The method of claim 1, further comprising:
    receiving at least one utilization threshold from the operator.

10. The method of claim 1, wherein the step of determining whether the utilization of the resource is above the corresponding utilization threshold and the step of identifying each such resource are carried out repeatedly.

11. The method of claim 1, further comprising:
    a step of pausing after the step of identifying each resource for which the utilization is above the corresponding utilization threshold.

12. The method of claim 1, further comprising:
    wherein the step of determining whether the utilization of the resource is above the corresponding utilization threshold and the step of identifying each such resource are carried out only upon receipt of a call connection establishment signal.

13. The method of claim 12, further comprising:
   determining whether the alarm has been generated since the utilization of the resource last rose above the specified threshold, wherein the step of generating the alarm is carried out only if the alarm has not been generated since the utilization of the resource last rose above the specified threshold.

14. The method of claim 13, wherein the step of generating the report further comprises:
   including the utilization of any identified resources in the report.

15. The method of claim 14, wherein the step of specifying the plurality of resource types further comprises:
   providing a list of resources, the list of resources including at least one of bandwidth, line card capacity, number of connection end points per line card, Virtual Path Identifier numbers, Virtual Connection Identifier numbers, MultiProtocol Label Switching (MPLS) label numbers, memory within the switch, number of supportable leaf endpoints per system, number of supportable connections in a connecting state, number of MPLS state blocks, and number of connections in a database, the step of determining whether the utilization of the resource is above the corresponding utilization threshold is carried out only with respect to resources within the list of resources, and further comprising:
   receiving at least one utilization threshold from the operator.

16. An apparatus configured to monitor resource utilization within a connection oriented network made of network elements, at least one of said network elements including a connection resource tracker for maintaining a database of resource utilization, the apparatus comprising:
   a processor; and
   a memory having instructions stored therein, wherein the instructions, when executed by the processor, cause the processor to specify a plurality of resource types for the network elements of the connection oriented network, each resource type being defined by a capacity limit and a utilization, provide a utilization threshold and a specified threshold for each specified type of resource, wherein the utilization threshold that triggers monitoring of high utilization is set at a threshold value used to determine whether resources are being over-utilized, and the specified threshold that triggers generation of alarms is set at a threshold value used to determine whether resources used are exceeding a maximum allowable limit, measure the utilization for all resources at the network elements, monitor for receipt of call connection establishment signals, compare, in response to a query from a user relating to a particular type of resource in said database, the measured utilization for all resources of the particular type with the utilization threshold for said particular type for determining whether the utilization of any resource of said particular type is above the corresponding utilization threshold, generate, if the utilization is above the corresponding utilization threshold for at least one said resource, a report and identifying in the report each resource of the particular type for which the utilization is above the corresponding utilization threshold and presenting the report to an operator of said connection oriented network, check, if the utilization is above the corresponding specified threshold for at least one said resource, a timer associated with the resource, generate, when the timer associated with the resource has expired, an alarm for the resource and resetting the timer associated with the resource only when the alarm has been generated for the resource, and, when the timer has not expired, selecting a next resource.

17. The apparatus of claim 16, wherein the plurality of resources includes at least one of bandwidth, line card capacity, number of connection end points per line card, Virtual Path Identifier numbers, Virtual Connection Identifier numbers, MultiProtocol Label Switching (MPLS) label numbers, memory within the switch, number of supportable leaf endpoints per system, number of supportable connections in a connecting state, number of MPLS state blocks, and number of connections in a database.

18. The apparatus of claim 16, further configured to provide a list of resources, wherein the instructions for determining whether the utilization of the resource is above the corresponding utilization threshold make this determination only with respect to resources within the list of resources.

19. The apparatus of claim 18, further configured to receive receiving at least one utilization threshold from the operator.

20. The apparatus of claim 16, further configured to receive at least one utilization threshold from the operator.

21. The apparatus of claim 16, further configured to include wherein the utilization of any identified resources in the report.

22. The apparatus of claim 21, further configured to provide a list of resources, the list of resources including at least one of bandwidth, line card capacity, number of connection end points per line card, Virtual Path Identifier numbers, Virtual Connection Identifier numbers, MultiProtocol Label Switching (MPLS) label numbers, memory within the switch, number of supportable leaf endpoints per system, number of supportable connections in a connecting state, number of MPLS state blocks, and number of connections in a database, wherein the instructions for determining whether the utilization of the resource is above the corresponding utilization threshold are executed only with respect to resources within the list of resources, and receive at least one utilization threshold from the operator.

23. The apparatus of claim 16, further configured to generate, upon identification of a resource for which the utilization is above the specified threshold, an alarm identifying the resource, and present the alarm to the operator.

24. The apparatus of claim 23, further configured to receive at least one utilization threshold from the operator.

25. The apparatus of claim 23, further configured to execute the instructions for determining whether the utilization of the resource is above the corresponding utilization threshold and the instructions for identifying each such resource repeatedly.

26. The apparatus of claim 25, further configured to pause after the instructions for identifying each resource for which the utilization is above the corresponding utilization threshold are executed.

27. The apparatus of claim 23, further configured to monitor for receipt of call connection establishment signals, and execute the instructions for determining whether the utilization of the resource is above the corresponding utilization threshold and the instructions for identifying each such resource upon receipt of a call connection establishment signal.

28. The apparatus of claim 27, further configured to determine whether the alarm has been generated since the utilization of the resource last rose above the corresponding specified threshold, and execute the instructions for generating the alarm only in the event that the alarm has not been generated since the utilization of the resource last rose above the corresponding specified threshold.

29. The apparatus of claim 28, further configured to include the utilization of any identified resources in the report.

30. The apparatus of claim 29, further configured to provide a list of resources, the list of resources including at least one of bandwidth, line card capacity, number of connection end points per line card, Virtual Path Identifier numbers, Virtual Connection Identifier numbers, MultiProtocol Label Switching (MPLS) label numbers, memory within the switch, number of supportable leaf endpoints per system, number of supportable connections in a connecting state, number of MPLS state blocks, and number of connections in a database; wherein the instructions for determining whether the utilization of the resource is above the corresponding utilization threshold are executed only with respect to resources within the list of resources, and receive at least one utilization threshold from the operator.

31. A non-transitory computer-readable medium comprising instructions for monitoring resource utilization within a connection oriented network made of network connections, at least one of said network elements including a connection resource tracker for maintaining a database of resource utilization, the computer-readable medium comprising:
   instructions for specifying a plurality of resource types for the network elements of the connection oriented network, each resource type being defined by a capacity limit and a utilization;
   instructions for providing a utilization threshold and a specified threshold for each specified type of resource, wherein the utilization threshold that triggers monitoring of high utilization is set at a threshold value used to determine whether resources are being over-utilized, and the specified threshold that triggers generation of alarms is set at a threshold value used to determine whether resources used are exceeding a maximum allowable limit;
   instructions for measuring the utilization for all resources at a network element;
   instructions for monitoring for receipt of call connection establishment signals;
   instructions for, in response to a query from a user relating to a particular type of resource in said database, comparing the measured utilization for all resources of the particular type with the utilization threshold for said particular type for determining whether the utilization of any resource of said particular type is above the corresponding utilization threshold;
   instructions for, if the utilization is above the corresponding utilization threshold for at least one said resource, generating a report and identifying in the report each resource of the particular type for which the utilization is above the corresponding utilization threshold and presenting the report to an operator of said connection oriented network; and
   instructions for, if the utilization is above the corresponding specified threshold for at least one said resource, checking a timer associated with the resource; and
   instructions for, when the timer has expired, generating an alarm for the resource and resetting the timer associated with the resource only when the alarm has been generated for the resource and, when the timer has not expired, selecting a next resource.

32. A method of monitoring resource utilization within a connection oriented network made of network elements, at least one of said network element including a connection resource tracker for maintaining a database of resource utilization, the method comprising:
   specifying a plurality of resource types for the network elements of the connection oriented network, each resource type being defined by a capacity limit and a utilization;
   providing a utilization threshold and a specified threshold for each specified type of resource, wherein the utilization threshold that triggers monitoring of high utilization is set at a threshold value used to determine whether resources are being over-utilized, and the specified threshold that triggers generation of alarms is set at a threshold value used to determine whether resources used are exceeding a maximum allowable limit;
   monitoring for receipt of call connection establishment signals;
   measuring the utilization threshold for all resources at a network element;
   in response to a query from a user relating to a particular type of resource in said database, comparing the utilization for all resources of the particular type as measured in the measuring step with the utilization threshold for said particular type for determining whether the utilization of any resource of said particular type is above the corresponding utilization threshold;
   if the utilization is above the corresponding utilization threshold for at least one said resource, generating a report and identifying in the report each resource of the particular type for which the utilization is above the corresponding utilization threshold and presenting the report to an operator of said connection oriented network; and
   if the utilization is above the corresponding specified threshold for at least one said resource, checking whether a flag associated with the resource indicates that an alarm has recently been generated for the resource, if the flag does not indicate that the alarm has recently been generated, generating the alarm and setting the flag to indicate that the alarm has recently been generated, and, if the flag indicates that the alarm has recently been generated, selecting a next resource.

33. The method of claim 32, further comprising:
   receiving at least one utilization threshold from the operator.

34. The method of claim 33, further comprising:
   providing a list of resources, wherein the step of determining whether the utilization of the resource is below the corresponding utilization threshold is carried out only with respect to resources within the list of resources.

35. The method of claim 34, wherein the step of generating the report further comprises:
   including the utilization of any identified resources in the report.

36. An apparatus configured to monitor resource utilization within a connection oriented network made of network elements, at least one of said network elements including a connection resource tracker for maintaining a database of resource utilization, the apparatus comprising:
   a processor; and
   a memory having instructions stored therein, wherein the instructions, when executed by the processor, cause the processor to specify a plurality of resource types for the network elements of the connection oriented network, each resource type being defined by a capacity limit and a utilization, provide a utilization threshold and a specified threshold for each specified type of resource, wherein the utilization threshold that triggers monitoring of high utilization is set at a threshold value used to determine whether resources are being over-utilized, and the specified threshold that triggers generation of alarms is set at a threshold value used to determine whether resources used are exceeding a maximum allowable limit, measure the utilization for all resources at the network element, monitor for receipt of call connection establishment signals, compare, in response to a query from a user relating to a particular type of resource in said database, the measured utilization for all resources of the particular type with the utilization threshold for said particular type for determining whether the utilization of any resource of said particular type is above the corresponding utilization threshold, generate, if the utilization is above the corresponding utilization threshold for at least one said resource, a report and identifying in the report each resource of the particular type for which the utilization is above the corresponding utilization threshold and presenting the report to an operator of said connection oriented network, and check, if the utilization is above the corresponding specified threshold for at least one said resource, whether a flag associated with the resource indicates that an alarm has recently been generated for the resource, if the flag does not indicate that the alarm has recently been generated, generating the alarm and setting the flag to indicate that the alarm has recently been generated and, if the flag indicates that the alarm has recently been generated, selecting a next resource.

37. The apparatus of claim 36, further configured to receive at least one utilization threshold from the operator.

38. The apparatus of claim 37, further configured to provide a list of resources, wherein the instructions for determining whether the utilization of the resource is below the corresponding utilization threshold are executed only with respect to resources within the list of resources.

39. The apparatus of claim 38, further configured to include the utilization of any identified resources in the report.

40. A non-transitory computer-readable medium comprising instructions for monitoring resource utilization within a connection oriented network made of network elements, at least one of said network elements including a connection resource tracker for maintaining a database of resource utilization, the computer-readable medium comprising:
  instructions for specifying a plurality of resource types for the network elements of the connection oriented network, each resource type being defined by a capacity limit and a utilization;
  instructions for providing a utilization threshold and a specified threshold for each specified type of resource, wherein the utilization threshold that triggers monitoring of high utilization is set at a threshold value used to determine whether resources are being over-utilized, and the specified threshold that triggers generation of alarms is set at a threshold value used to determine whether resources used are exceeding a maximum allowable limit;
  instructions for measuring the utilization for all resources at the network element;
  instructions for monitoring for receipt of call connection establishment signals;
  instructions for, in response to a query from a user relating to a particular type of resource in said database, comparing the measured utilization for all resources of the particular type with the utilization threshold for said particular type for determining whether the utilization of any resource of said particular type is above the corresponding utilization threshold;
  instructions for, if the utilization is above the corresponding utilization threshold for at least one said resource, generating a report and identifying in the report each resource of the particular type for which the utilization is above the corresponding utilization threshold and presenting the report to an operator of said connection oriented network; and
  instructions for, if the utilization is above the corresponding specified threshold for at least one said resource, checking whether a flag associated with the resource indicates that an alarm has recently been generated for the resource, if the flag does not indicate that the alarm has recently been generated, generating the alarm and setting the flag to indicate that the alarm has recently been generated, and, if the flag indicates that the alarm has recently been generated, selecting a next resource.

41. A method of monitoring and diagnosing resource utilization within a connection oriented network made of network elements, at least one of said network elements including a connection resource tracker for maintaining a database of resource utilization, the method comprising:
  specifying a plurality of resource types for the network elements of the connection oriented network, each resource type being defined by a capacity limit and a utilization;
  providing a utilization threshold and a specified threshold for each specified type of resource, wherein the utilization threshold that triggers monitoring of high utilization is set at a threshold value used to determine whether resources are being over-utilized, and the specified threshold that triggers generation of alarms is set at a threshold value used to determine whether resources used are below a minimum allowable limit;
  monitoring for receipt of call connection establishment signals;
  measuring the utilization for all resources at the network elements;
  in response to a query from a user relating to a particular type of resource, comparing the utilization for all resources of the particular type as measured in the measuring step with the utilization threshold for said particular type for determining whether the utilization of any resource of said particular type is below the corresponding utilization threshold;
  if the utilization is below the corresponding utilization threshold for at least one said resource, generating a report and identifying in the report each resource of the particular type for which the utilization is below the corresponding utilization threshold and presenting the report to an operator of said connection oriented network;
  if the utilization is below the corresponding specified threshold for at least one said resource, checking a timer associated with the resource;
  when the timer has expired, generating an alarm for the resource and resetting the timer associated with the resource only when the alarm has been generated for the resource; and, when the timer has not expired, selecting a next resource.

42. A method of monitoring resource utilization within a connection oriented network made of network elements, at least one of said network element including a connection resource tracker for maintaining a database of resource utilization, the method comprising:

specifying a plurality of resource types for the network elements of the connection oriented network, each resource type being defined by a capacity limit and a utilization;

providing a utilization threshold and a specified threshold for each specified type of resource, wherein the utilization threshold that triggers monitoring of high utilization is set at a threshold value used to determine whether resources are being over-utilized, and the specified threshold that triggers generation of alarms is set at a threshold value used to determine whether resources used are below a minimum allowable limit;

monitoring for receipt of call connection establishment signals;

measuring the utilization threshold for all resources at a network element;

in response to a query from a user relating to a particular type of resource in said database, comparing the utilization for all resources of the particular type as measured in the measuring step with the utilization threshold for said particular type for determining whether the utilization of any resource of said particular type is below the corresponding utilization threshold;

if the utilization is below the corresponding utilization threshold for at least one said resource, generating a report and identifying in the report each resource of the particular type for which the utilization is below the corresponding utilization threshold and presenting the report to an operator of said connection oriented network; and if the utilization is below the corresponding specified threshold for at least one said resource, checking whether a flag associated with the resource indicates that an alarm has recently been generated for the resource, if the flag does not indicate that the alarm has recently been set, generating the alarm and setting the flag to indicate that the alarm has recently been generated, and, if the flag indicates that the alarm has recently been generated, selecting a next resource.

* * * * *